United States Patent
Plazek

(10) Patent No.: US 10,889,429 B2
(45) Date of Patent: Jan. 12, 2021

(54) SYSTEM AND METHOD FOR CONVERTING A COMMODITY TRAILER WITH GRAVITY DISCHARGE SLIDE GATES TO BE COMPATIBLE WITH A PNEUMATIC OUTLET GATE AND AN INTERCHANGEABLE PNEUMATIC GATE THEREFOR

(71) Applicant: WILSON TRAILER COMPANY, Sioux City, IA (US)

(72) Inventor: Brett Plazek, Sioux City, IA (US)

(73) Assignee: WILSON TRAILER COMPANY, Sioux City, IA (US)

( * ) Notice: Subject to any disclaimer, the term of this patent is extended or adjusted under 35 U.S.C. 154(b) by 0 days.

(21) Appl. No.: 16/437,601

(22) Filed: Jun. 11, 2019

(65) Prior Publication Data

US 2020/0062497 A1   Feb. 27, 2020

Related U.S. Application Data

(60) Provisional application No. 62/684,953, filed on Jun. 14, 2018.

(51) Int. Cl.
*B65D 88/54* (2006.01)
*B65G 67/24* (2006.01)
*F16B 5/02* (2006.01)

(52) U.S. Cl.
CPC .......... *B65D 88/548* (2013.01); *B65G 67/24* (2013.01); *F16B 5/02* (2013.01); *B65G 2203/02* (2013.01); *B65G 2814/0319* (2013.01)

(58) Field of Classification Search
CPC .. B65G 90/006; B65G 90/0006; B65G 9/004; B65G 9/00; B65G 90/0004; B65G 67/24; B65G 2814/0319; B65D 88/546; B65D 88/548; F16B 5/02
USPC ........................................... 193/2 A
See application file for complete search history.

(56) References Cited

U.S. PATENT DOCUMENTS

| | | | |
|---|---|---|---|
| 3,650,567 A * | 3/1972 | Danielson | B65D 90/587 406/130 |
| 6,085,948 A | 7/2000 | Putze | |
| 6,412,422 B2 * | 7/2002 | Dohr | B61D 7/20 105/282.1 |
| 7,077,601 B2 * | 7/2006 | Lloyd | E01C 23/065 180/209 |

* cited by examiner

*Primary Examiner* — Gene O Crawford
*Assistant Examiner* — Lester Rushin, III
(74) *Attorney, Agent, or Firm* — Jacobson Holman PLLC

(57) ABSTRACT

A system and method for enabling a commodity trailer having conventional gravity discharge slide gates to operate with a pneumatic discharge configuration on an as-needed basis is provided. A pneumatic discharge gate, which supports a pneumatic discharge assembly, is configured to directly replace the gravity fed hopper gate and to be retained on the same hopper structure that supported the slide gate so that the slide gate and the pneumatic discharge gate, and the uses thereof, are fully interchangeable.

14 Claims, 18 Drawing Sheets

SYSTEM AND METHOD FOR CONVERTING A COMMODITY TRAILER WITH GRAVITY DISCHARGE SLIDE GATES TO BE COMPATIBLE WITH A PNEUMATIC OUTLET GATE AND AN INTERCHANGEABLE PNEUMATIC GATE THEREFOR

This application claims priority from U.S. provisional application Ser. No. 62/684,953, filed Jun. 14, 2018.

BACKGROUND OF THE INVENTION

Field of the Invention

The present invention is related to the field of hopper bottom trailers and, more particularly, to a system and method for interchangeable conversion of a gravity discharge hopper on a commodity trailer for operation with a pneumatic discharge system and vice versa.

Description of the Related Art

Hopper bottom trailers are typically utilized to haul granular bulk material that can be readily discharged by gravity through a hopper discharge opening into a pit or conveying system by opening a sliding gate at the bottom of the hopper. See, for example, U.S. Pat. No. 6,085,948, owned by Wilson Trailer Company. Pneumatic discharge systems, on the other hand, utilize pressure differential created by a blower to move material through a series of hoses and pipes from the trailer to storage containers or processing facilities. Pneumatic discharge systems of this type are popular in rail cars and dry bulk tanker trailers and are primarily used to transfer very fine particulate materials that are difficult to contain or control in open air environments.

It would be advantageous to provide means by which a hopper bottom trailer, having conventional gravity fed bottom hoppers and sliding hopper gates, could be converted for use with a pneumatic discharge system so as to enable a user to configure and optimize the same trailer to handle different materials while using a common set of components and features for installation of the different gates.

SUMMARY OF THE INVENTION

In view of the foregoing, the present invention is directed to a system and method for providing a pneumatic outlet gate for a hopper bottom trailer that is fully and easily interchangeable with a conventional gravity fed sliding gate and uses the same hopper structure to retain either type of gate on the bottom of the hopper. While configured to directly replace the gravity fed sliding gate, the pneumatic outlet gate allows for the attachment of pneumatic discharge hoses and contains the necessary controls to meter product and air flow during the unloading process. By being fully compatible with existing gravity fed sliding gate mounting features, the interchangeable pneumatic outlet gate according to the present invention enables the owner-operator of a trailer having a hopper bottom equipped with a conventional slide gate to configure and optimize such trailer for either gravity fed gate or pneumatic gate operation based on the type of material being hauled and the discharge location associated with a particular delivery on a case by case basis.

According to a first embodiment, the hopper is provided with a hopper frame, traditionally referred to as a trap frame in the industry, having side rails and rollers. The gravity gate is supported on the rollers and moved between open and closed positions using a rack and pinion system or other mechanism of like function. The pneumatic gate, when mounted in place of the gravity gate, is similarly supported on the rollers of the hopper frame, being pushed into the frame and thereafter retained thereon in use. To achieve this mounting interchangeability with the gravity gate, the pneumatic outlet gate includes a generally horizontal support frame that is supported on the rollers. This support frame defines a central open area, with the support frame enabling the pneumatic gate to be mounted on the same hopper frame structure normally occupied by the sliding gate and to be in flow communication with the downwardly facing discharge opening of the bottom hopper when the pneumatic gate is mounted.

According to a second embodiment, the present invention provides for interchangeably mounting either a gravity fed gate or a pneumatic outlet gate to a fixed mounting surface on the hopper generally embodied as a sloped bottom wall. To provide the interchangeability, each of the gravity and pneumatic gates has its own trap frame coupled thereto, the gate and trap frame forming a gate assembly.

Each of the trap frames has a sloped upper flange that is configured with a plurality of apertures that align with a corresponding pattern of apertures on the sloped bottom wall mounting surface of the hopper. A plurality of bolts or similar fastening elements are engaged within the aligned pairs of apertures to secure the gate assembly to the hopper. Hence, while the functional operation of the gates is different, the common mounting features of the trap frames of each assembly enable both gates to be alternately mounted to the same hopper mounting surface using the same or like kinds of fastening elements.

As in the first embodiment, the pneumatic gate has a central open area in flow communication with the downwardly facing discharge opening of the bottom hopper when the pneumatic gate is mounted. The bottom of the trap frame on the gravity gate according to the second embodiment includes rails and rollers to support the gate and the movement thereof in like manner to the hopper frame components of the first embodiment.

The present invention is also directed to a hopper bottom trailer usable with either a gravity fed sliding gate or a pneumatic outlet gate. Both gates are interchangeably mountable to the hopper adjacent the discharge opening thereof, according to either the first or the second embodiments just described, to enable the trailer to unload different types of particulate materials through the discharge opening using either gravity unloading or pneumatic unloading without altering the functionality of the existing structure of the hopper bottom trailer.

Accordingly, it is an object of the present invention to provide a system and method for enabling a hopper bottom trailer equipped with a conventional gravity fed sliding gate to be readily converted for operational use with a pneumatic outlet gate.

Another object of the present invention is to provide a system and method for a hopper bottom trailer in accordance with the preceding object in which the pneumatic outlet gate is fully and easily interchangeable with the conventional gravity fed sliding gate, with both types of gates using the same hopper and/or frame components to retain each gate on the bottom of the hopper.

A further object of the present invention is to provide a system and method for a hopper bottom trailer in accordance with the preceding objects in which the pneumatic outlet gate includes a pneumatic discharge assembly that allows for the attachment of pneumatic discharge hoses and contains the necessary controls to meter product and air flow during the unloading process like a dedicated pneumatic outlet gate without altering or requiring any changes to the existing structure of the hopper bottom trailer.

Another object of the present invention is to provide a hopper bottom trailer for transporting and discharging particulate materials that includes at least one bottom hopper with a downwardly facing discharge opening, and a gravity fed sliding gate and a pneumatic outlet gate interchangeably mountable on the bottom hopper for unloading different types of particulate materials from the trailer using either gravity fed or pneumatic pressure to discharge the materials through the hopper discharge opening.

Yet another object of the present invention is to provide a hopper bottom trailer in accordance with the preceding object in which the pneumatic outlet gate includes a pneumatic discharge assembly that provides for attachment of pneumatic discharge hoses and also contains the necessary controls for product metering and air flow during unloading.

A further object of the present invention is to provide a pneumatic outlet gate that can be mounted in place of a sliding gate on a conventional gravity feed hopper to discharge fine particulate material from a hopper bottom trailer.

A still further object of the present invention is to provide a method by which the owner/operator of a hopper bottom trailer equipped with a conventional gravity fed sliding gate can easily configure and optimize such trailer for either gravity fed or pneumatic discharge operation based on the type of material being hauled and the discharge location associated with a particular delivery on a case by case basis, maximizing productivity and the efficient use of a capital asset.

Another object of the present invention is to provide a pneumatic outlet gate in accordance with at least one of the preceding objects in which, according to a first embodiment, the pneumatic outlet gate includes a generally horizontal support frame that defines a central open area, the frame being configured to be installed within a hopper frame structure normally occupied by the sliding gate while the central open area is in flow communication with a downwardly facing discharge opening of the bottom hopper, and a pneumatic discharge assembly attached to an underside of the support frame.

Yet another object of the present invention is to provide a pneumatic outlet gate in accordance with the preceding object that is operable with an existing moving and retaining mechanism used in connection with a gravity fed sliding gate on a hopper bottom trailer so as to be fully and easily interchangeable with such existing gravity fed sliding gate without requiring any functional modification to the existing hopper bottom trailer structure.

A further object of the present invention to provide a system and method for enabling a hopper bottom trailer to be interchangeably operable with a gravity fed sliding gate and a pneumatic outlet gate according to a second embodiment in which each gate is equipped with a trap frame to form a gate assembly that is configured to be removably coupled to the hopper in like manner as the other gate assembly.

A still further object of the present invention is to provide a system and method for interchangeably mounting gate assemblies on a hopper bottom trailer in accordance with the preceding object in which the gate assemblies are mounted to a fixed mounting surface on the hopper with fasteners such as bolts that rigidly secure the trap frame to the bottom of the hopper.

Yet a further object of the present invention is to provide an interchangeable gate assembly for a hopper bottom trailer in accordance with the preceding object in which the trap frame of each gate assembly includes an upper flange with a plurality of apertures that align with corresponding apertures in the fixed hopper mounting surface, the trap frame rigidly securing the gate to the mounting surface using fastening elements such as bolts, the arrangement of the apertures and fastening elements being common for both gate assemblies for ready interchangeability.

Another object of the present invention is to provide a hopper bottom trailer in accordance with the preceding object in which the side rails and rollers used to support the gravity gate and the movement thereof are mounted to the lower side of the gravity gate trap frame.

These and other objects of the invention, as well as many of the intended advantages thereof, will become more readily apparent when reference is made to the following description taken in conjunction with the accompanying drawings.

DESCRIPTION OF THE PREFERRED EMBODIMENTS

Figure 1:
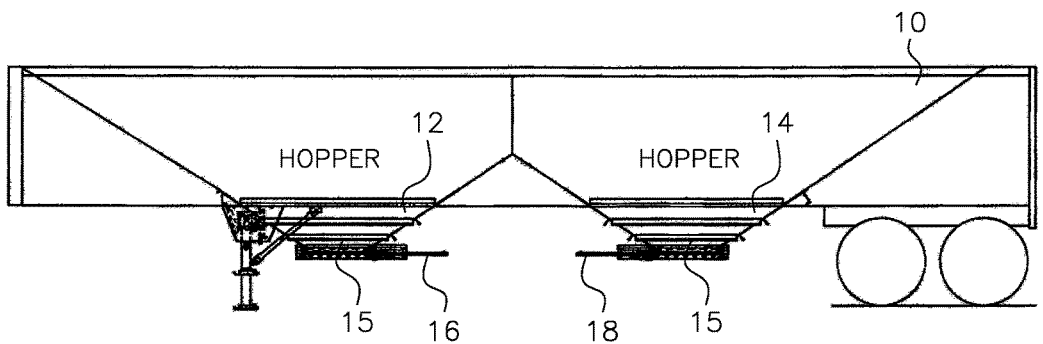
FIG. 1 is a side view of a conventional hopper commodity trailer having two gravity fed hoppers and associated sliding gates.

In describing two preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIG. 1, a typical commodity trailer 10 has two bottom hoppers 12, 14 with a bottom facing discharge opening or outlet 15 from each being controlled by a respective gravity discharge sliding gate 16, 18. According to the present invention, either or both of these gravity discharge sliding gates may be interchanged with a pneumatic outlet gate representatively shown by the pneumatic outlet gate 20 fixed in place of the respective gravity fed sliding gate 18 on hopper 14, as shown in FIG. 2.

Figure 2:
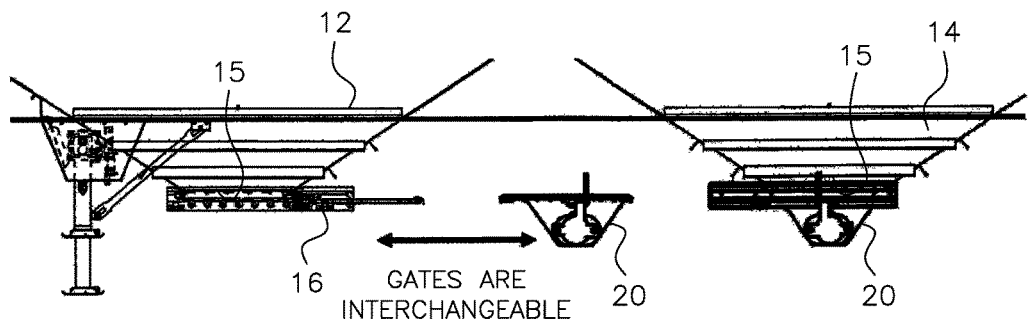
FIG. 2 is a side view of the hopper gate portion of a trailer like that shown in FIG. 1 but with one of the gravity fed hopper gates having been replaced with an interchangeable pneumatic gate in accordance with a first embodiment of the present invention.
Figure 3:
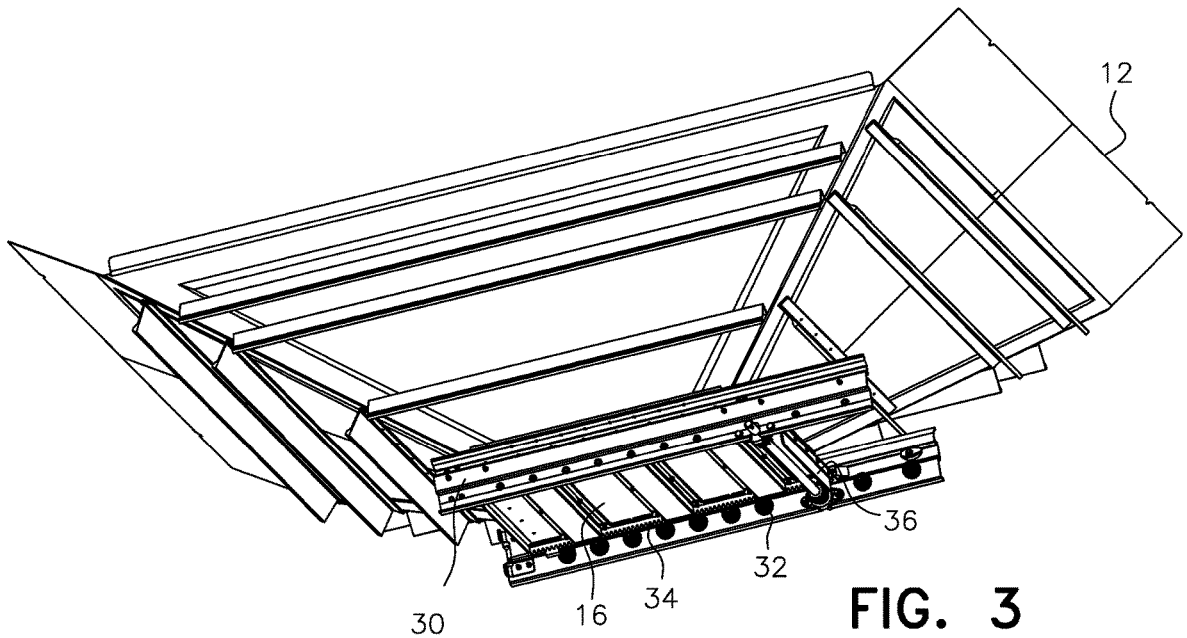
FIG. 3 is a bottom side perspective view of a sliding gate mounted on a gravity fed hopper in which the gravity gate is interchangeable with a pneumatic gate in accordance with a first embodiment of the present invention.
Figure 4:
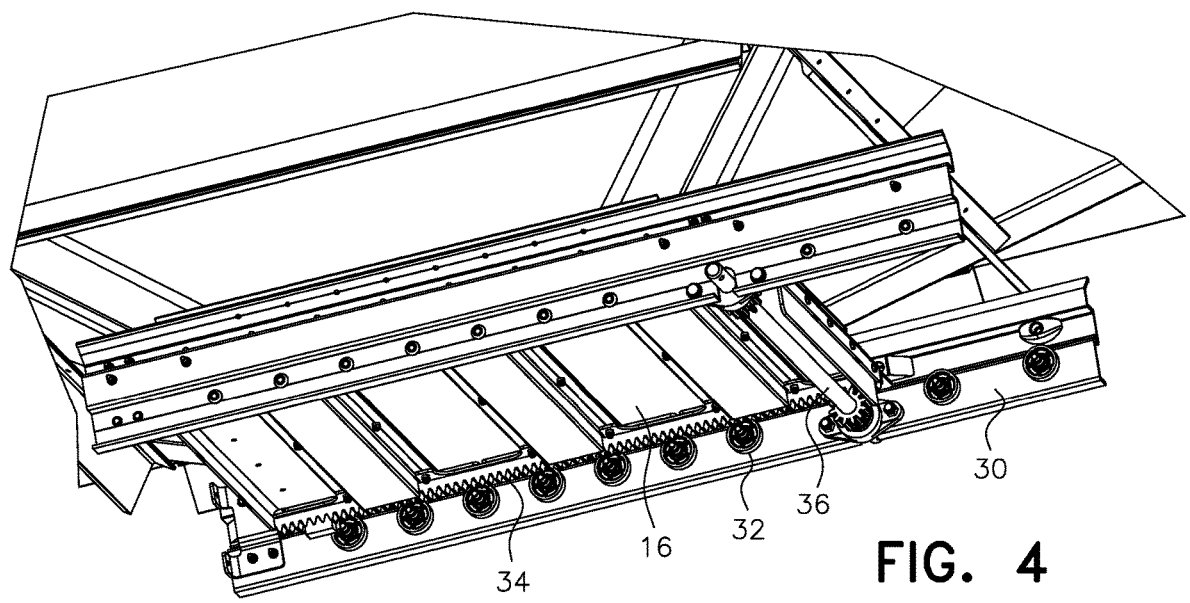
FIG. 4 is an enlargement of the hopper frame and sliding gate of FIG. 3.

A bottom perspective view of a hopper 12 like that shown in FIGS. 1 and 2 with a gravity discharge sliding gate 16 mounted in accordance with a first embodiment of the present invention is shown in FIGS. 3 and 4. The bottom of each hopper includes a frame generally designated by reference numeral 28, and generally known in the industry as a trap frame, that is mounted to the hopper bottom by fasteners, welding and the like. The frame 28 includes a pair of frame rails 30 interconnected by a pair of crossbars 31 (see, e.g., FIGS. 11-13B). Mounted on the inside of each frame rail 30 are a series of generally horizontally spaced rollers 32. In the preferred embodiments, movement and retention of the sliding gate for gravity discharge is controlled by a rack and pinion system that includes a rack 34 on each side of the gate and a pinion shaft 36 that engages with each rack 34. When installed on the frame rails 30 as shown, the sliding gate 16 is retained vertically on the top of the rollers 32. Horizontal movement as well as retention in a given horizontal position is controlled by the pinion shaft 36 which is rotated using a crank handle (not shown) or by other structure or mechanism for such purpose as is known in the art. The crank handle or other structure or mechanism includes a locking feature that locks the gate in place when engaged.

Figure 5:
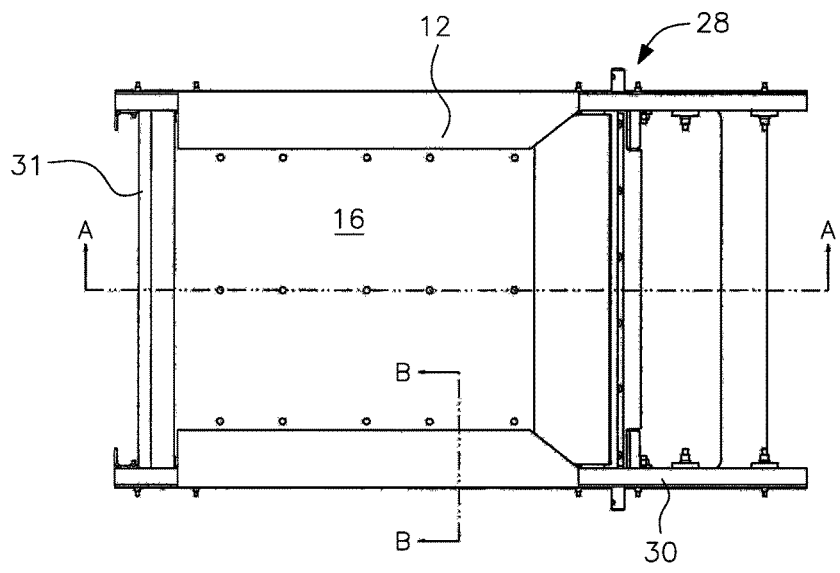
FIG. 5 is a top plan view of the sliding gate shown in FIG. 3 as installed on a hopper frame according to the first embodiment.
Figure 6:
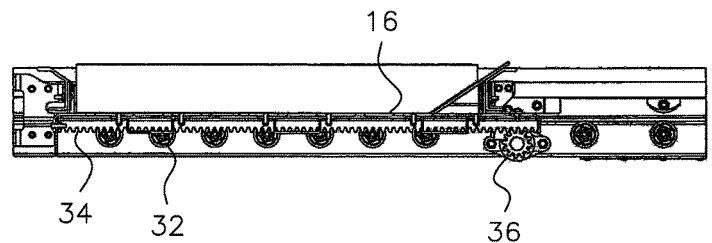
FIG. 6 is a section view taken along line A-A of FIG. 5.
Figure 7:
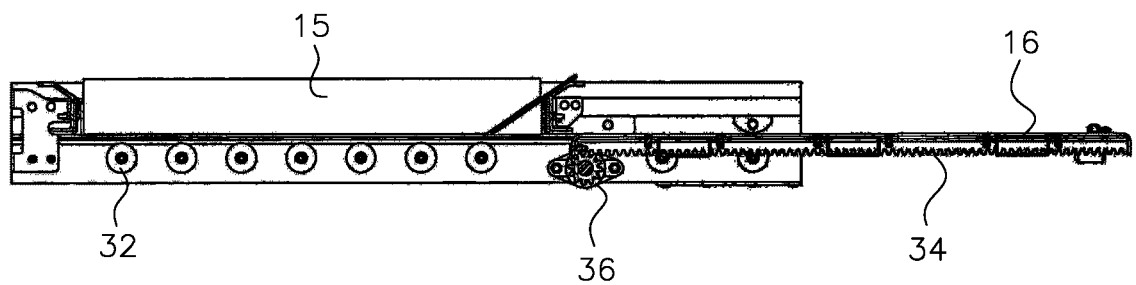
FIG. 7 is a section view like that shown in FIG. 5 but showing the hopper sliding gate in the open position.
Figure 8:
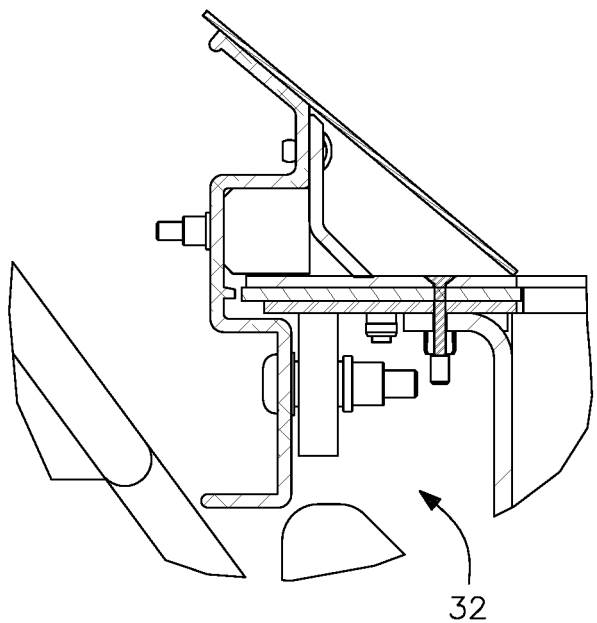
FIG. 8 is a section view of a roller used to provide vertical support and to assist in horizontal movement of the interchangeable sliding gate and pneumatic gate in accordance with the present invention.
Figure 9:
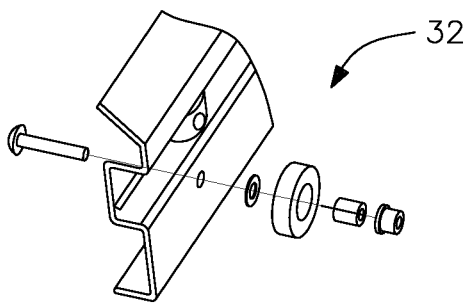
FIG. 9 is an exploded perspective view of the roller components shown in the assembled cross sectional view of FIG. 8.

A top view of the sliding gate 16 as installed in a hopper frame according to the first embodiment is shown in FIG. 5, the sliding gate being in the closed position, with a sectional view being provided in FIG. 6. FIG. 7 shows the sliding gate 16 in the open position as achieved by operation of the rack and pinion system using the crank handle, or by other structure or mechanism for such purpose, to move the sliding gate in the manner known in the art. FIG. 8 is a section view of one of the rollers that provide vertical gate support while also assisting in movement. FIG. 9 is an exploded perspective view of a roller like that shown as assembled in cross section in FIG. 8.

Figure 12A:
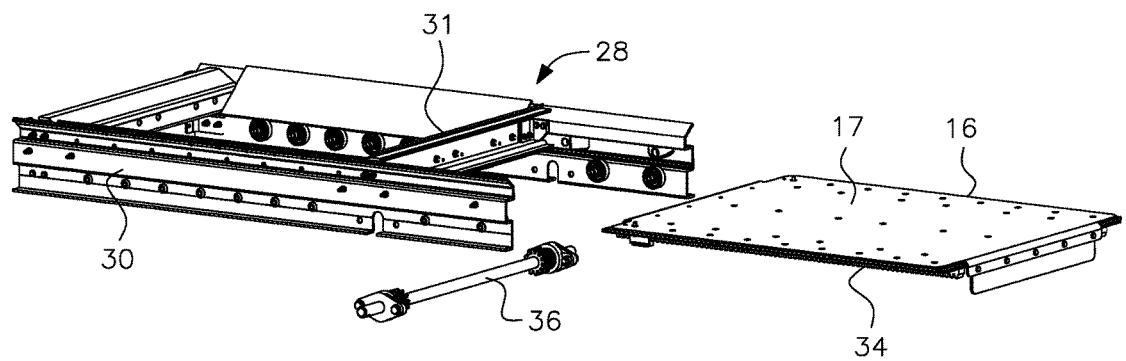
FIG. 12A is an exploded view showing a further disassembly of the components shown in FIG. 11, the sliding gate having been removed from the hopper frame.
Figure 12B:
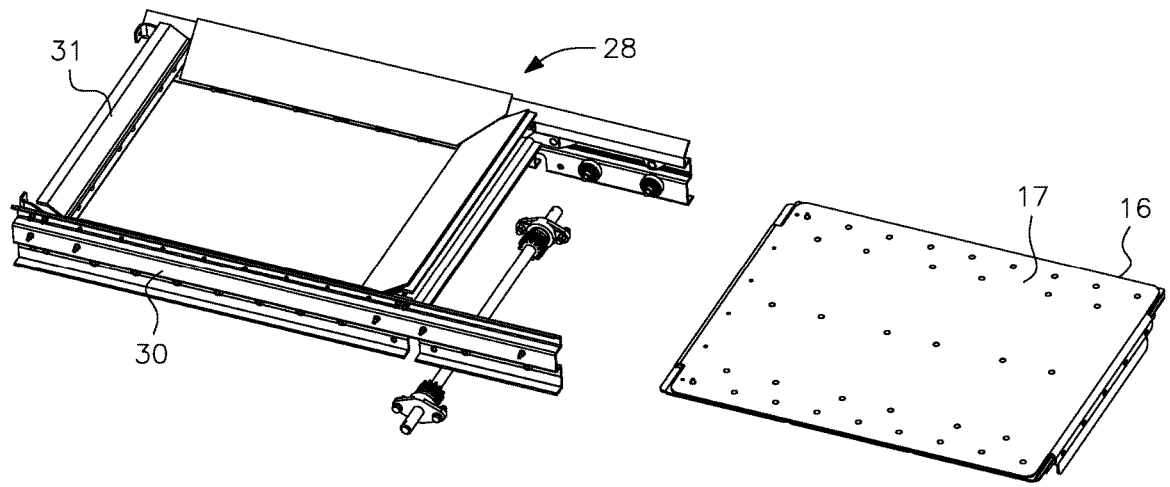
FIG. 12B is an upper perspective view of the disassembled components shown in FIG. 12A.

As best seen in FIGS. 12A and 12B, the sliding gate includes a substantially flat panel 17 that acts to block the hopper discharge opening 15 when the sliding gate is in the closed position shown in FIG. 6. When the sliding gate is moved to the open position shown in FIG. 7, the contents (granular material) held in the hopper are free to flow from the trailer through the hopper discharge opening 15 as is known in the art.

Figure 10:
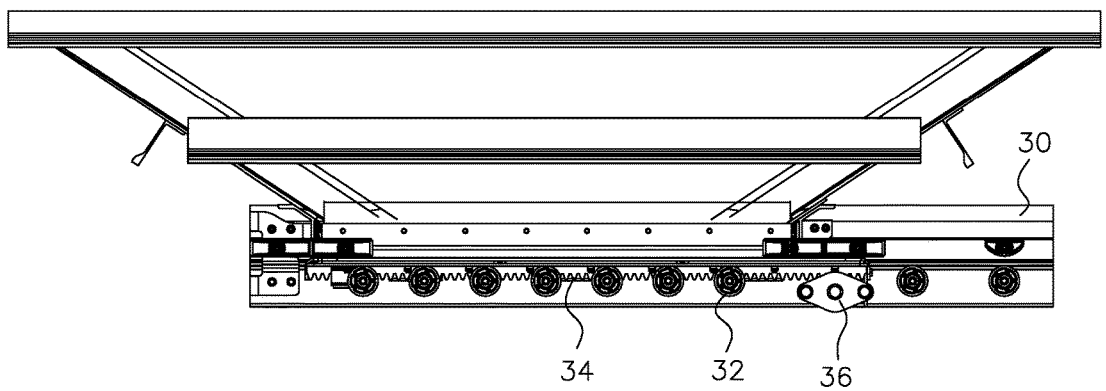
FIG. 10 is a side cut-away view of the sliding gate secured to the hopper frame by the pinion shaft as shown in FIG. 4.
Figure 11:
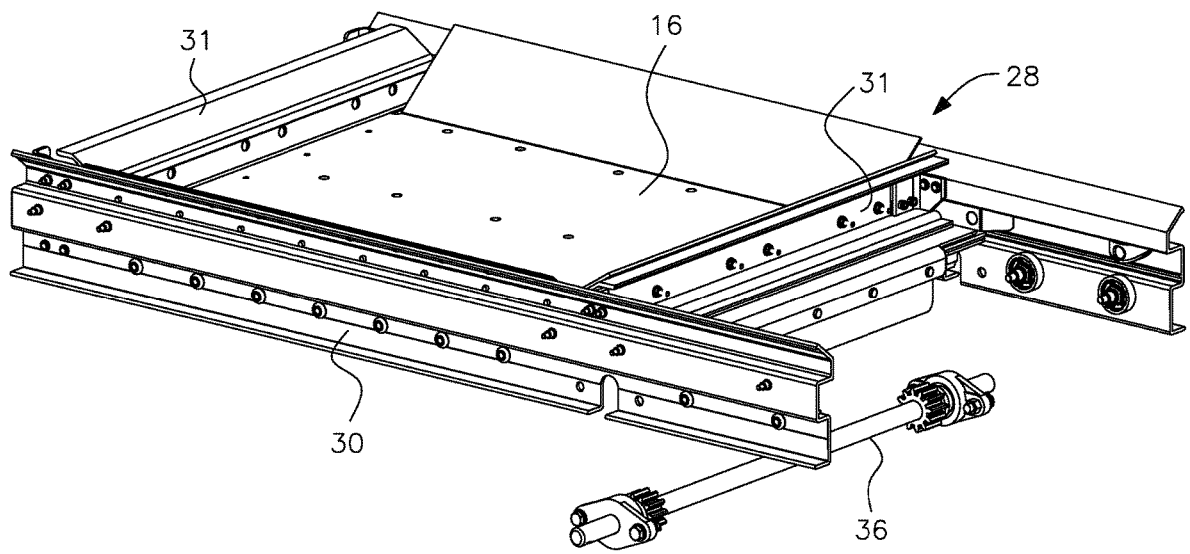
FIG. 11 is a top side perspective view of a hopper frame and sliding gate with the pinion shaft uncoupled to allow the gate to be removed horizontally from the hopper frame according to the first embodiment.

FIG. 10 is a side cut-away view of the sliding gate 16 secured to the hopper frame rails 30 by the pinion shaft 36. In FIG. 11, the pinion shaft 36 has been removed so that the gate or door 16, no longer constrained in movement by the engagement of the shaft with the rack 34, can be removed by pulling the disengaged sliding gate out of the frame through continued horizontal movement as shown in FIGS. 12A and 12B.

Figure 13A:
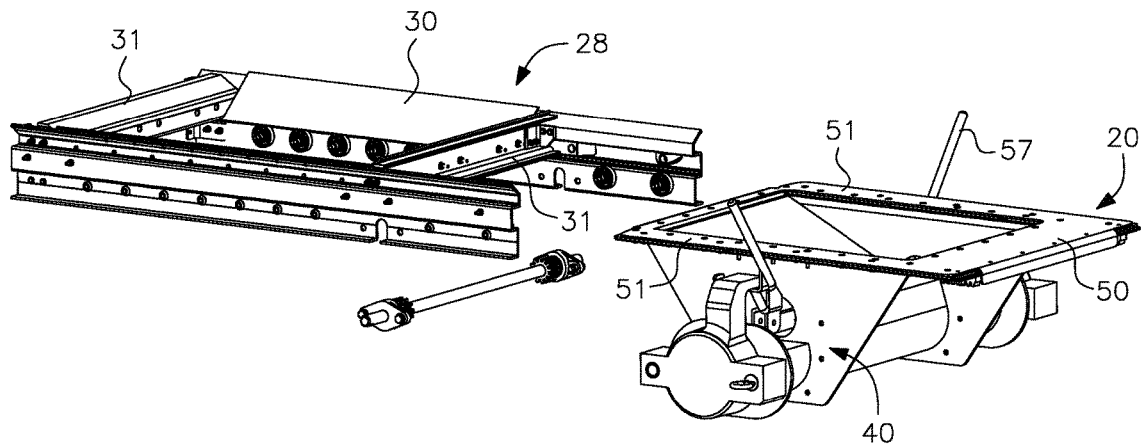
FIG. 13A is an exploded view showing the uncoupled hopper frame and pinion shaft of FIG. 12B but with a pneumatic gate positioned for mounting in accordance with the present invention.
Figure 13B:
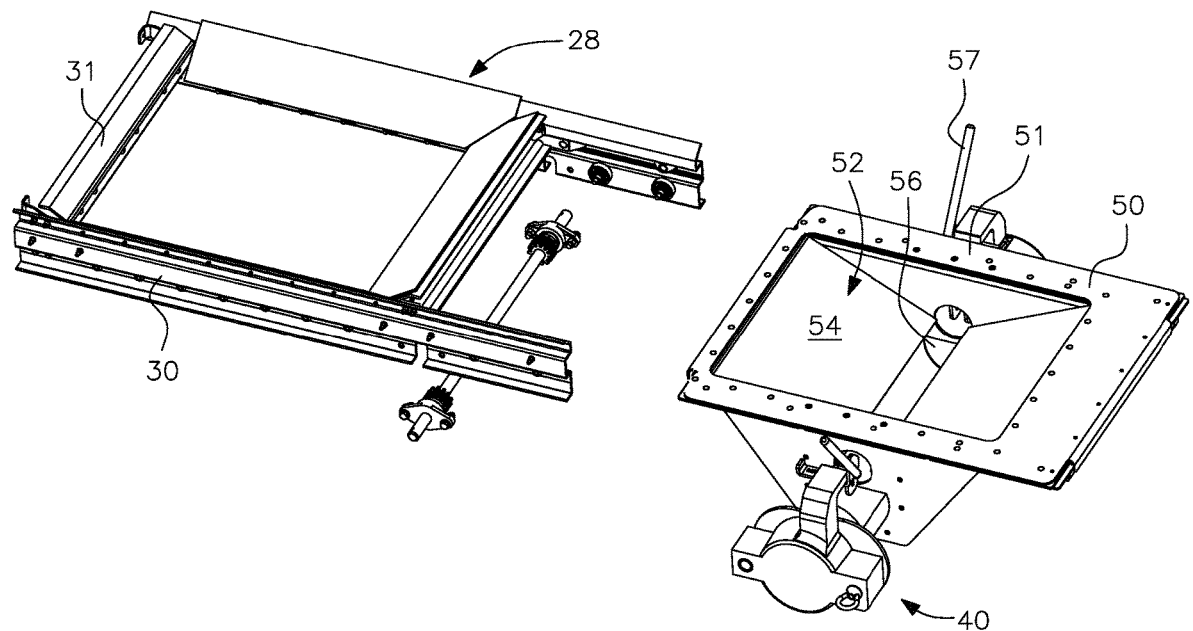
FIG. 13B is another view of the components shown in FIG. 13A.
Figure 14A:
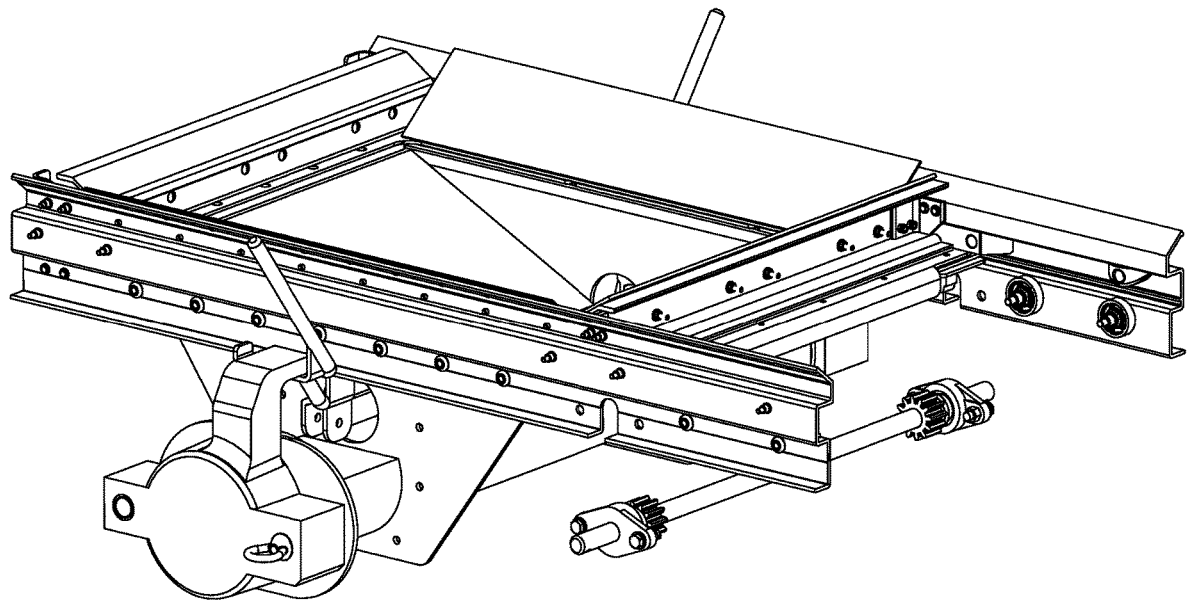
FIG. 14A is a top side perspective view showing the pneumatic gate installed in the hopper frame where it is retained vertically by the rollers on the frame according to the first embodiment.
Figure 14B:
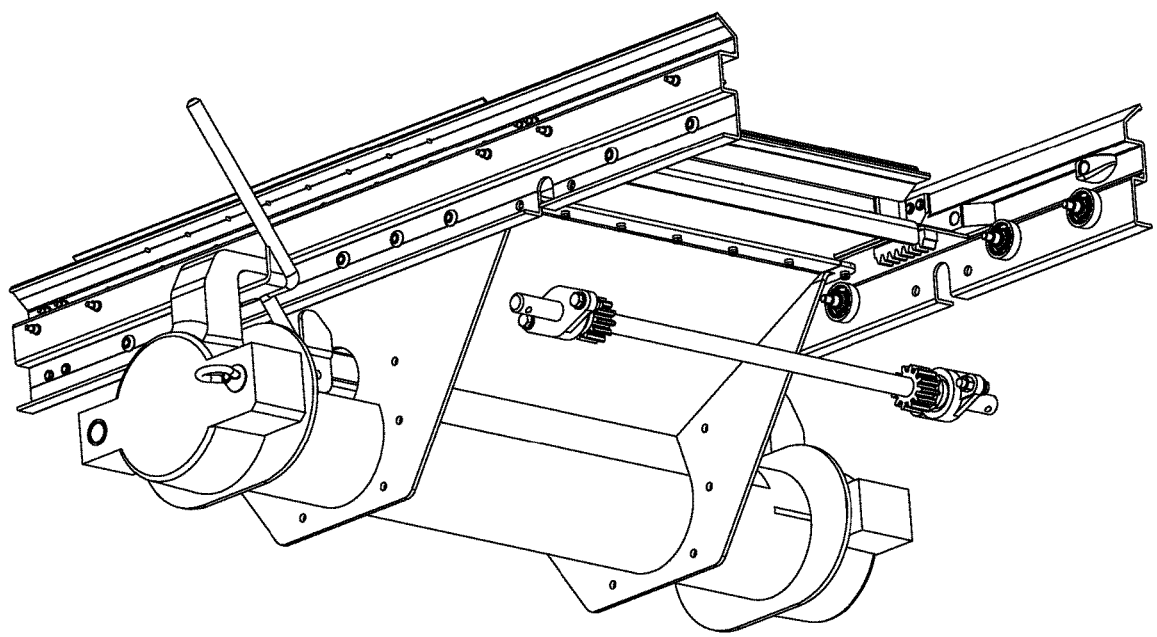
FIG. 14B is a bottom side perspective view of the components in the state of assembly shown in FIG. 14A.
Figure 15:
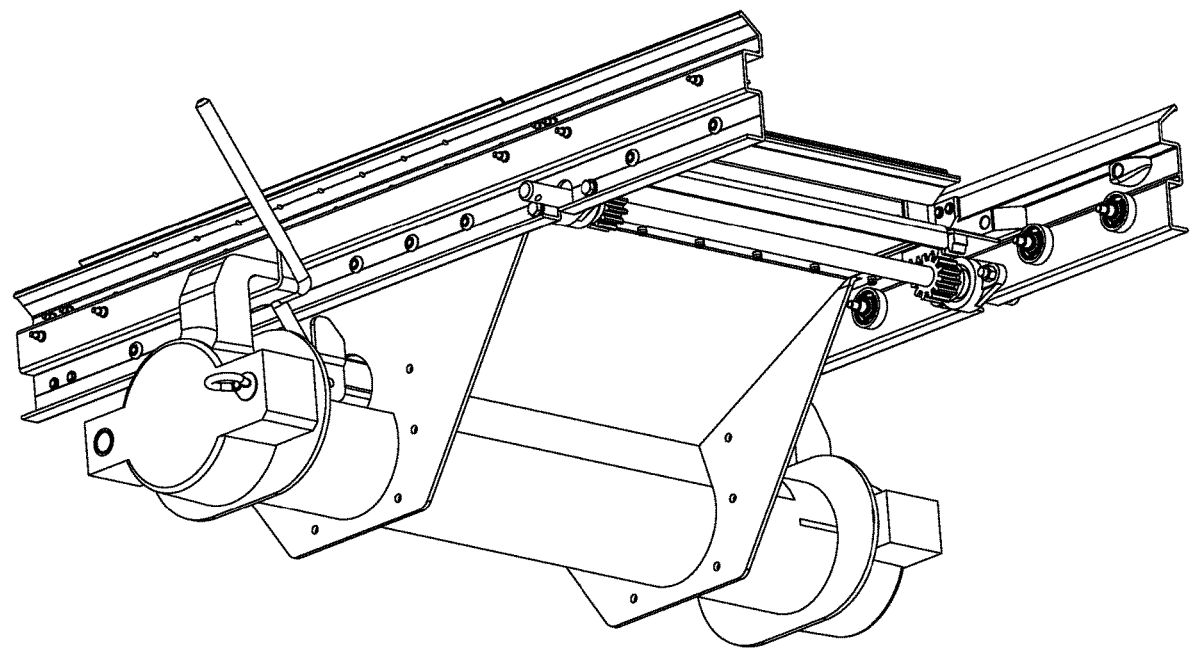
FIG. 15 is another bottom side perspective view of the pneumatic gate mounted on the frame and secured with the pinion shaft coupled to the frame and engaged with a piece of rack on the pneumatic gate according to the first embodiment.
Figure 16:
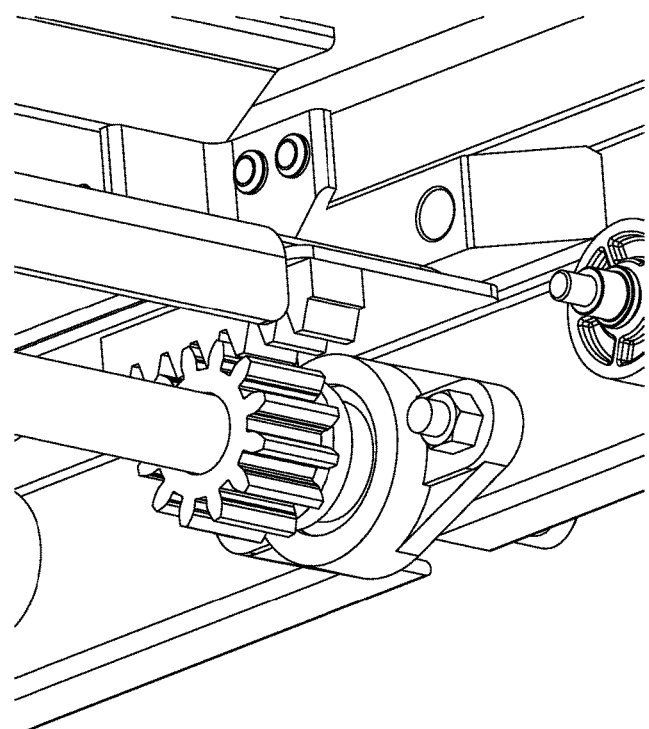
FIG. 16 is an enlarged view of the portion of FIG. 15 that shows the engagement between the pinion and the piece of rack on the pneumatic gate that prevents horizontal movement of the gate once mounted in like manner as when the sliding gate is installed.
Figure 17A:
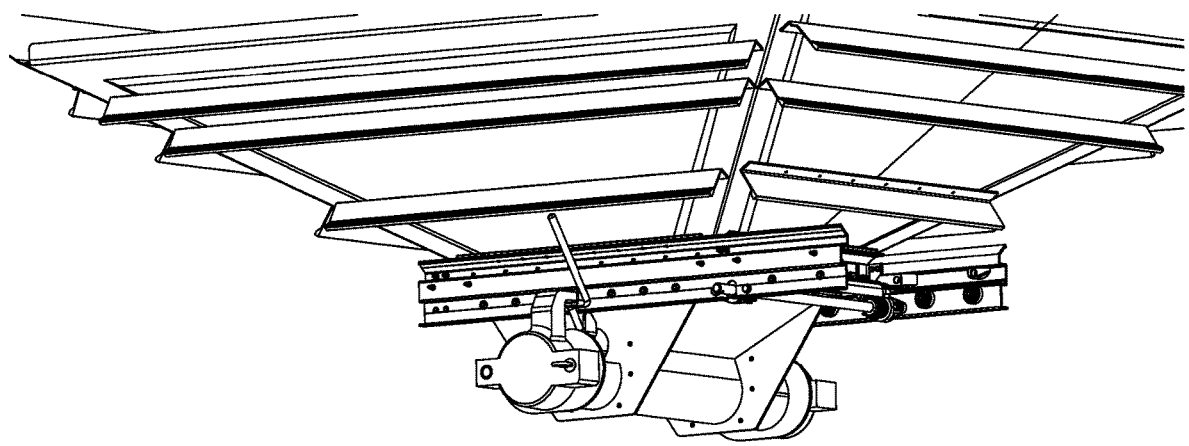
FIG. 17A is a side perspective view of the pneumatic gate as fully installed in place of the sliding gate in accordance with the first embodiment of the present invention.
Figure 17B:
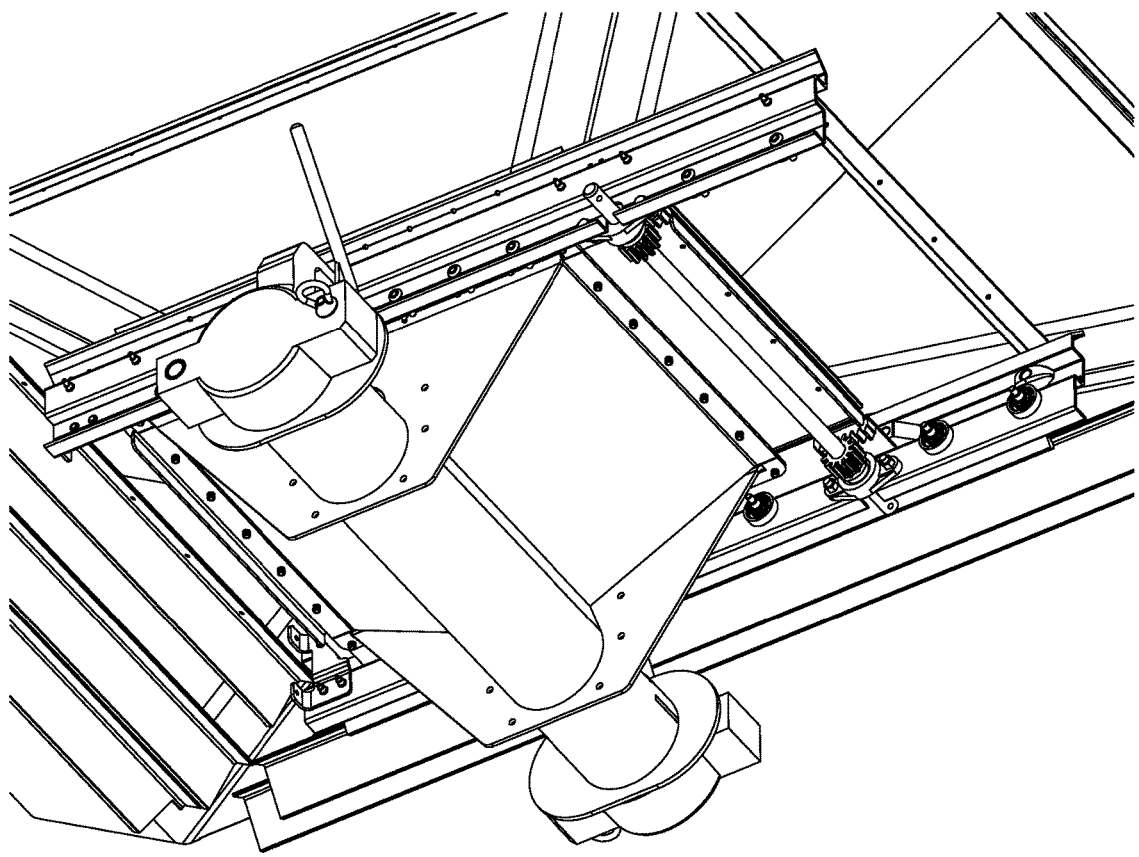
FIG. 17B is a bottom side perspective view of the assembled components shown in FIG. 17A.
Figure 18:
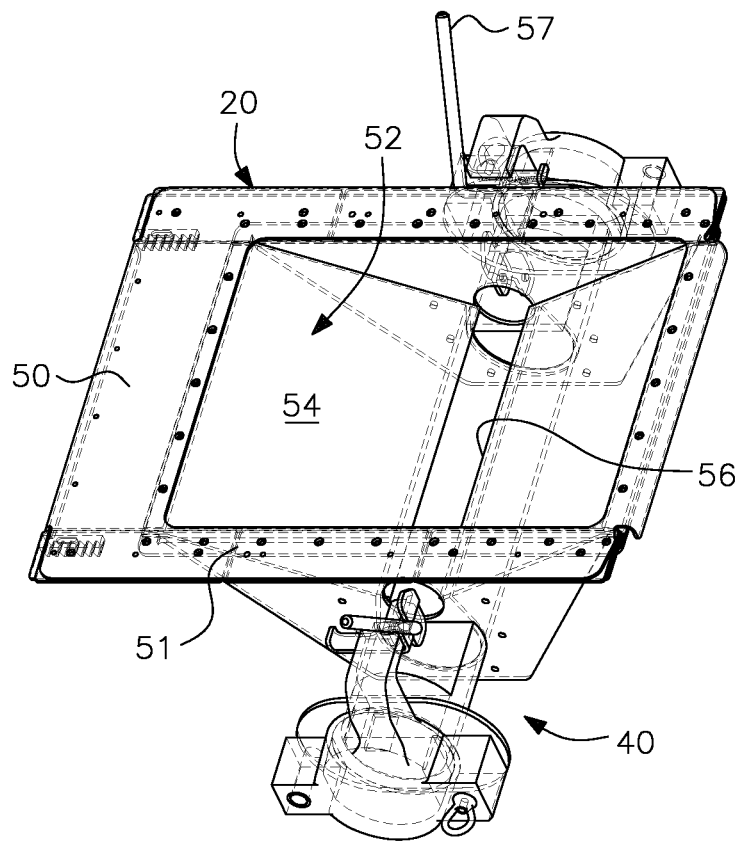
FIG. 18 is a line drawing of the pneumatic gate corresponding with the top side perspective view shown in FIG. 13B but rotated 180 degrees with respect thereto.
Figure 19:
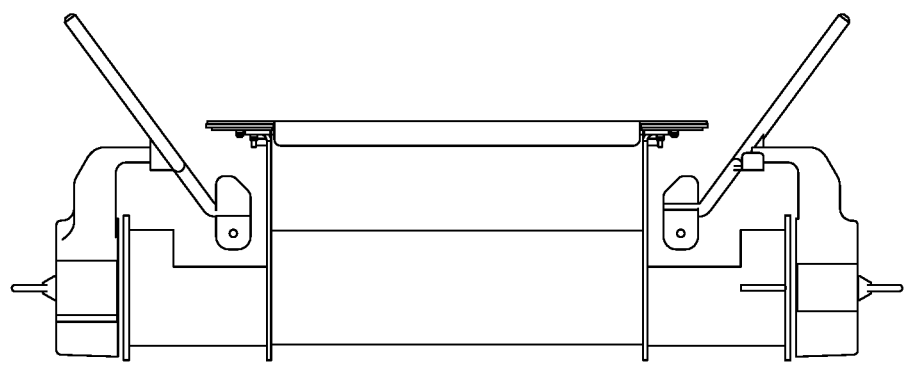
FIG. 19 is an end view of the pneumatic gate shown in FIG. 18.
Figure 20:
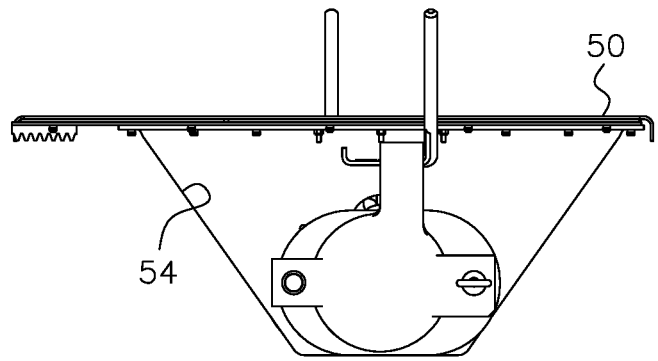
FIG. 20 is a side view of the pneumatic gate shown in FIG. 18.
Figure 21:
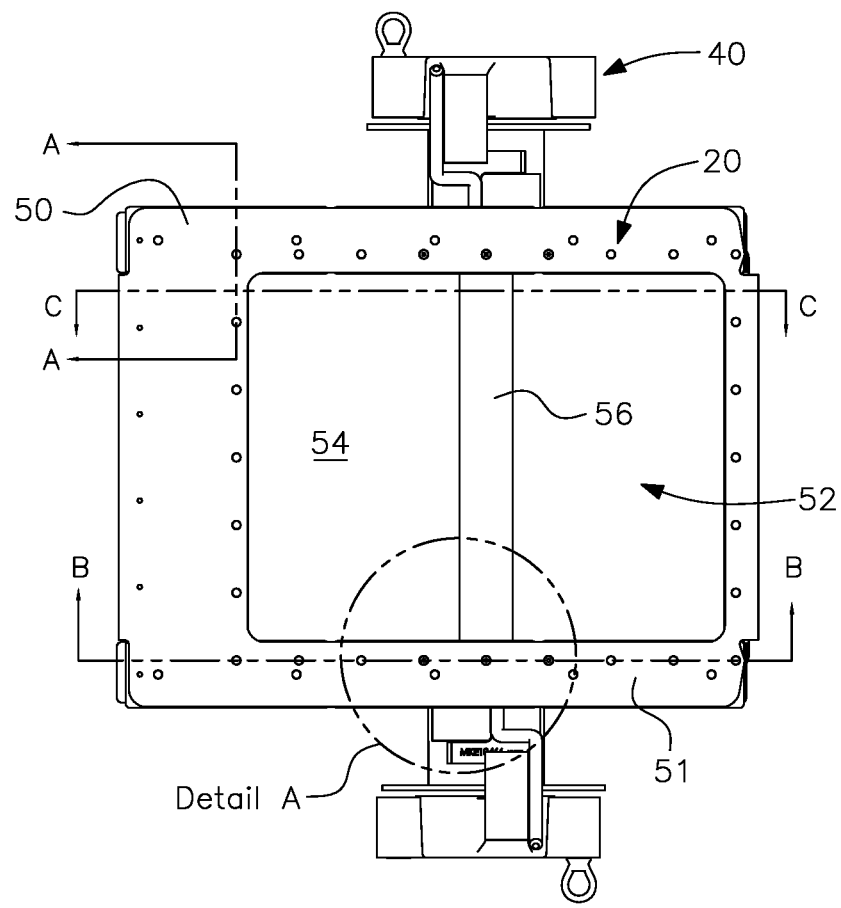
FIG. 21 is a top plan view of the pneumatic gate shown in FIG. 18.
Figure 21A:
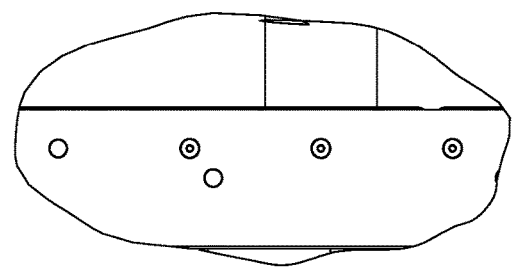
FIG. 21A in an enlarged view of Detail A of FIG. 21.
Figure 22:
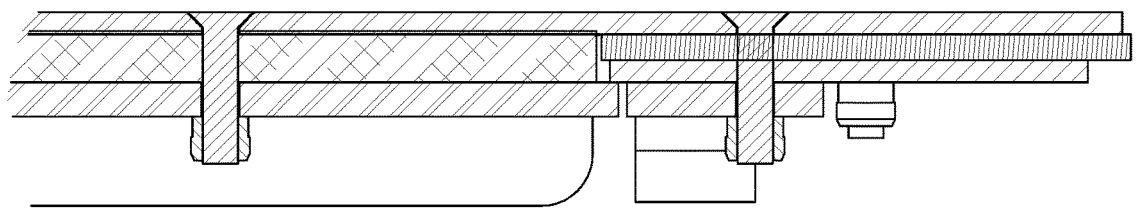
FIG. 22 is a section view taken along line A-A of FIG. 21.
Figure 23:
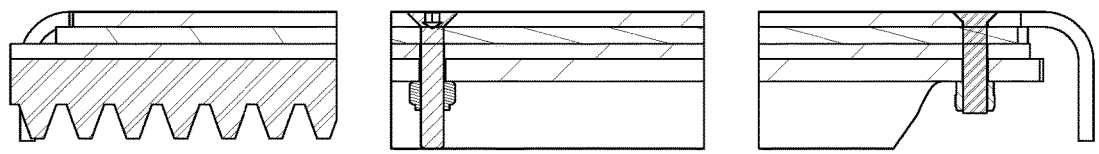
FIG. 23 is a section view taken along line B-B of FIG. 21.
Figure 24:
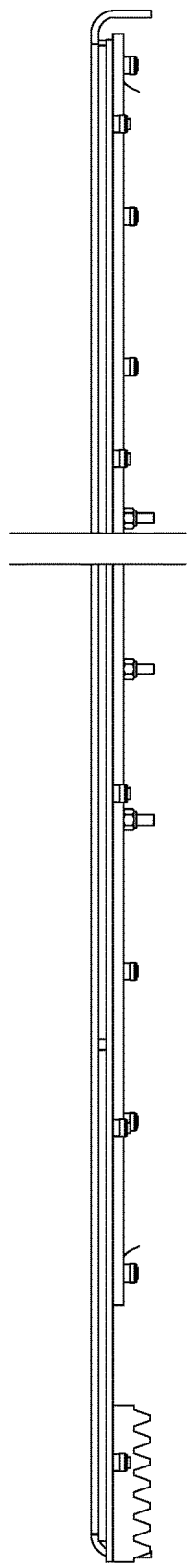
FIG. 24 is a section view taken along line C-C of FIG. 21.
Figure 27:
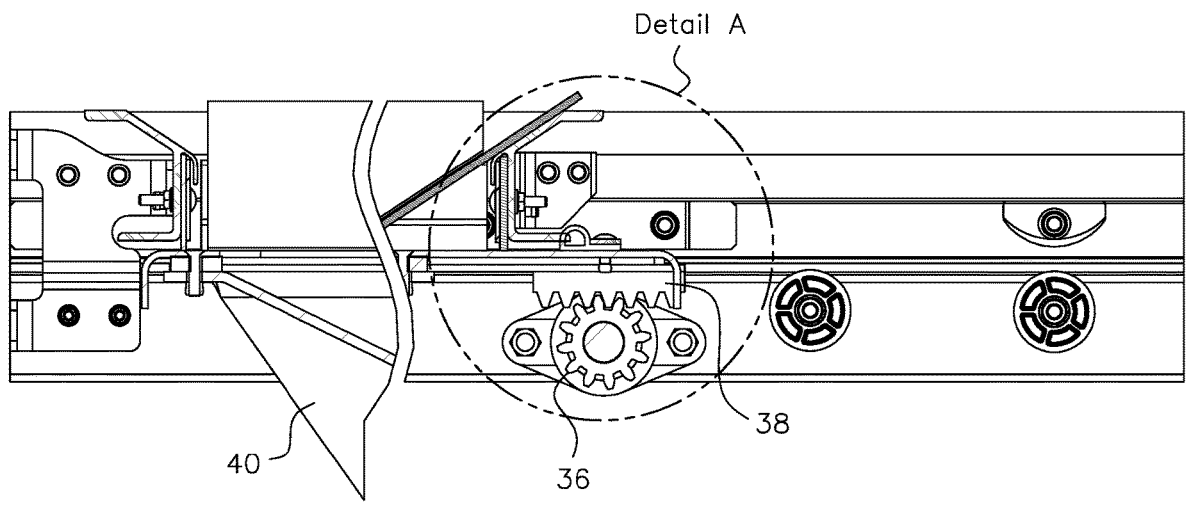
FIG. 27 is an excised portion of the sectional view shown in FIG. 26.
Figure 28:
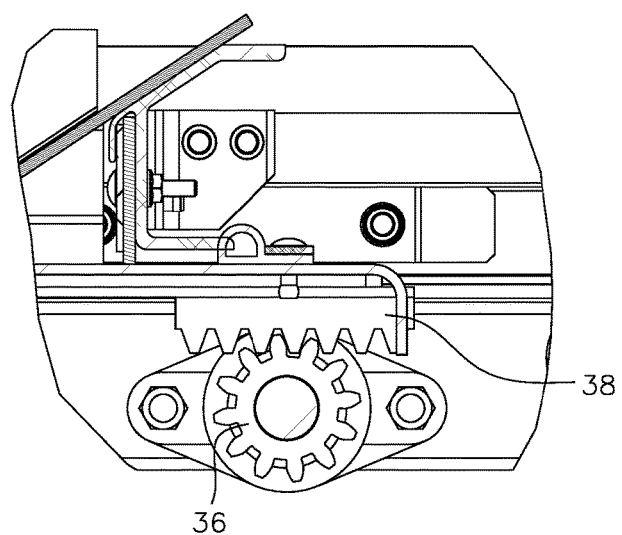
FIG. 28 is an enlarged view of Detail A of FIG. 27.
Figure 29:
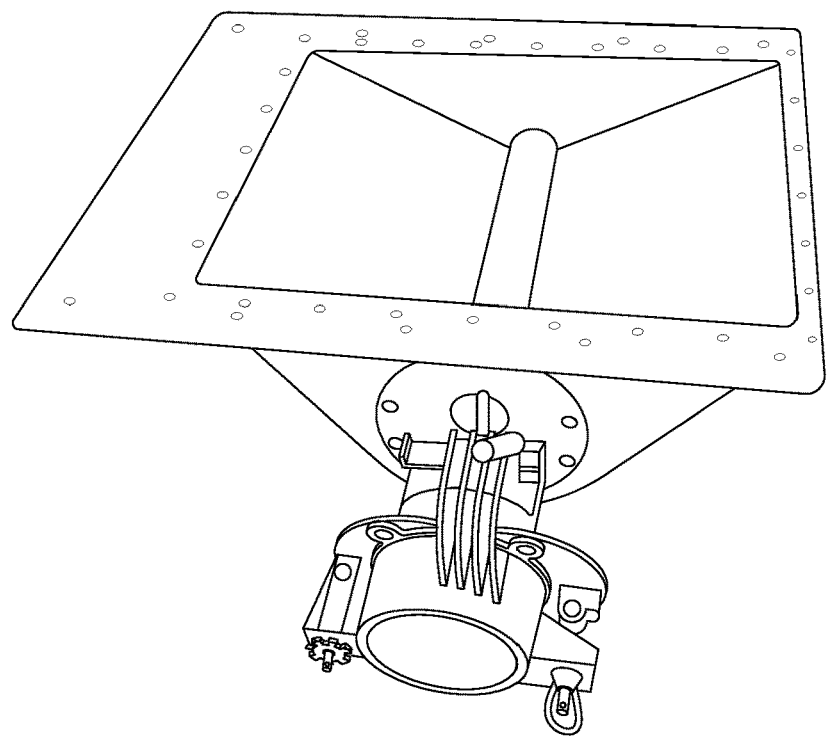
FIG. 29 is a photograph of an uninstalled pneumatic gate constructed for testing in accordance with the first embodiment of the present invention.
Figure 30:
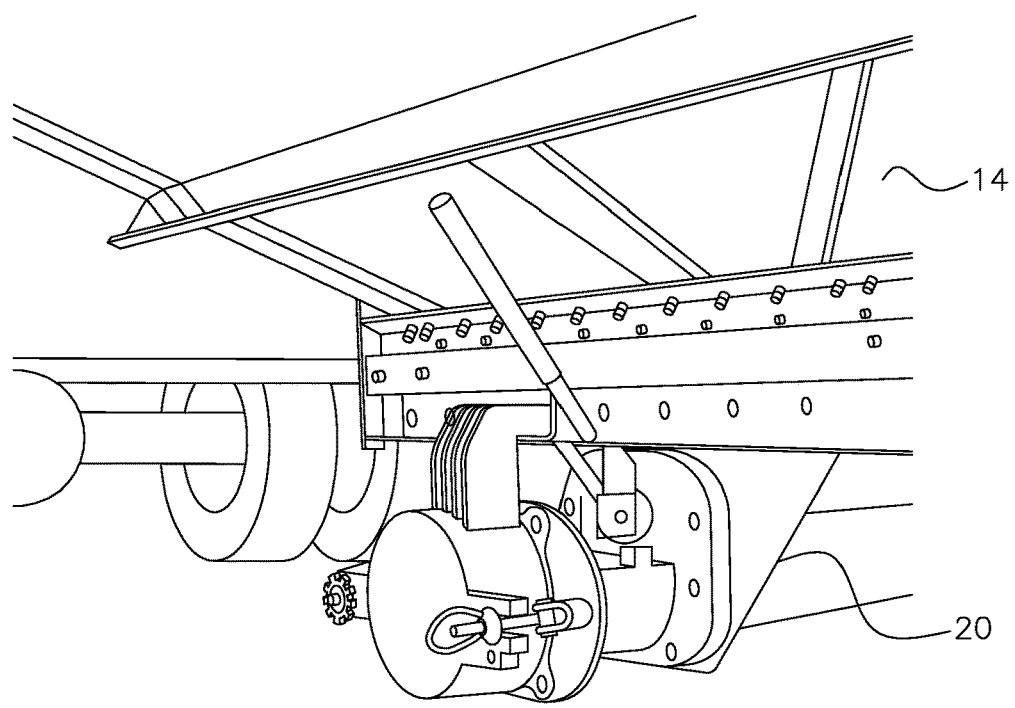
FIG. 30 is a photograph showing an enlarged perspective side view of a pneumatic gate installed for test purposes on a hopper trailer in accordance with the first embodiment.
Figure 31:
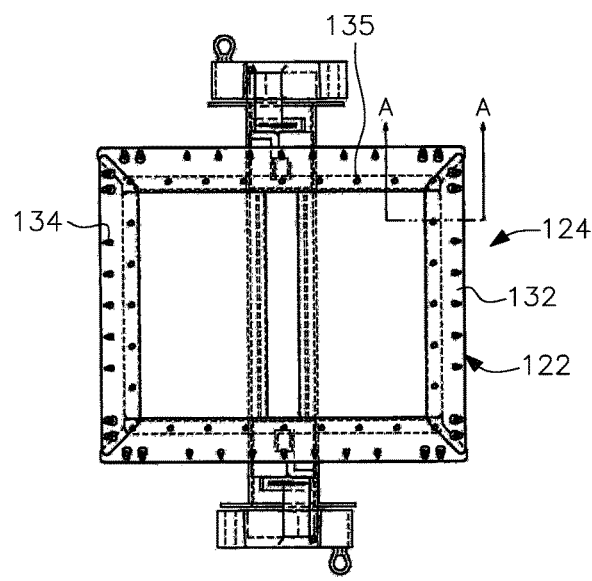
FIG. 31 is a top plan view of a pneumatic gate with a trap frame according to a second embodiment of the present invention.

With the gravity discharge sliding gate 16 thus removed, the pneumatic gate 20 according to the first embodiment, with its associated pneumatic discharge hose attachment assembly generally designated by reference numeral 40, may be installed through horizontal movement starting as shown in FIGS. 13A and 13B. The gate 20 is supported on the rollers 32, in like manner as the gravity sliding gate, and is pushed into the frame to reach the position shown in FIGS. 14A and 14B. The pinion shaft 36 is then re-installed as shown in FIG. 15, and engages with a piece of rack 38 on the pneumatic gate 20 to retain the gate within the frame when in use in like manner to the locking function of the rack 34 and pinion 36 when using the gravity discharge sliding gate 16. The locking engagement of the pinion shaft with the piece of rack 38 is shown in the enlarged view of FIG. 16 and is also shown in FIGS. 27 and 28. FIGS. 17A and 17B show two views of the original gravity discharge-configured hopper now fully converted for use with the installed pneumatic gate 20. To return the hopper trailer to gravity fed discharge operation the steps already described are repeated except that the pneumatic gate is removed and the gravity sliding date is installed.

FIGS. 18-24 present schematic drawings of various views of the pneumatic outlet gate 20 and its associated pneumatic discharge hose attachment assembly 40. According to the first embodiment, the gate 20 includes a generally rectangular support frame 50 with side portions 51 that interface with the hopper frame rails 30 in the same manner as the panel 17 of the sliding gate 16, thus making the pneumatic gate fully interchangeable with the sliding gate for attachment to the hopper.

The support frame 50 surrounds a central open area generally designated by reference numeral 52 defined by at least one wall 54 that slopes downwardly and inwardly to form a chute having a bottom discharge opening or slot 56 through which the contents of the trailer flow during the discharge operation. In the embodiment shown, there are two walls 54 of approximately equal size and slope but other configurations may be used to direct material flow toward the discharge slot 56. The discharge slot 56 is in communication with the pneumatic discharge hose attachment assembly 40 which includes a handle component 57 to adjust the size of the slot opening so as to achieve the desired flow rate for accommodating different fine particulate materials as is known in the art. According to the first embodiment shown, the assembly 40 is a commercially available component such as that marketed by Powerbrace Corporation of Kenosha, Wis., that enables the interchangeable pneumatic gate of the present invention to be coupled to the necessary hoses used in pneumatic discharge systems while also providing the necessary controls to meter product and air flow during the unloading process.

Figure 26:
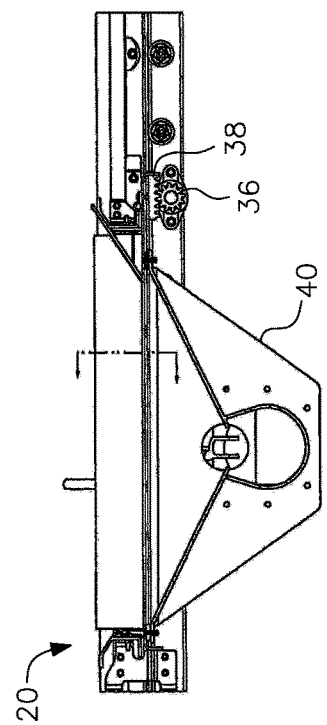
FIG. 26 is a section view taken along line A-A of FIG. 25.
Figure 25:
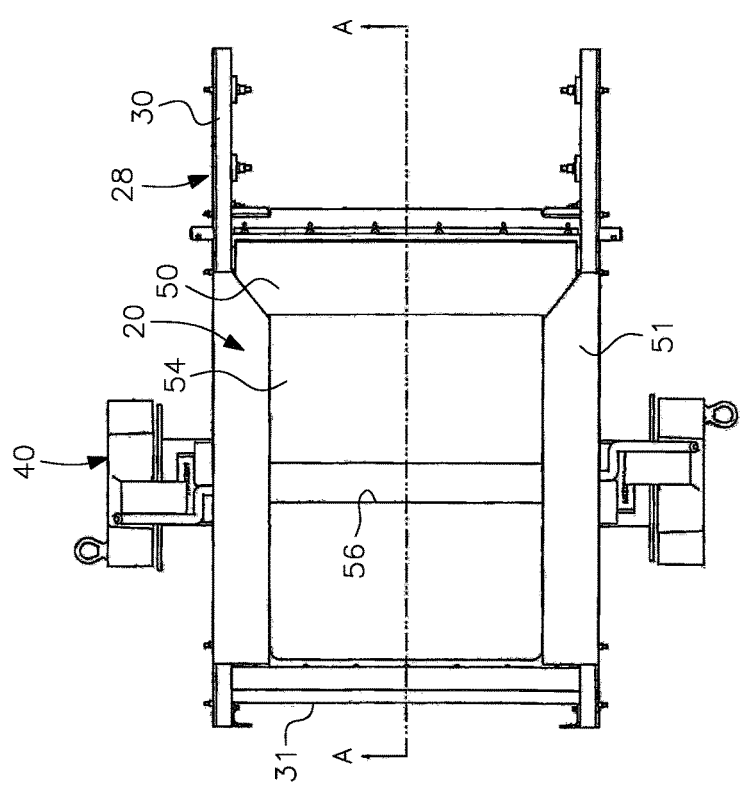
FIG. 25 is a top plan view of the pneumatic gate installed in the hopper frame in accordance with the first embodiment of the present invention.

FIG. 25 is a top view of the pneumatic gate as mounted on the hopper frame according to the first embodiment. FIG. 26 is a section view taken along line A-A of FIG. 25. FIG. 27 is an enlarged view of the end portions of the section view shown in FIG. 26, the assembly 40 having been largely excised to provide a better view of the piece of rack 38 and pinion shaft 36 used to retain the pneumatic gate 20 within the frame when in use. FIG. 28 is a further enlargement of Detail A of FIG. 27. As shown, the gate 20 is retained in the frame, i.e., cannot be moved horizontally out of the frame, by the engagement between the piece of rack 38 on the gate and the pinion shaft 36 which locks the gate in place once it has been installed.

In the first embodiment described herein, the gravity discharge sliding gate is controlled in horizontal movement and then retained in a set position by the rack and pinion system operative with the pinion shaft 36 as has been described. Hence, the support frame 50 of the pneumatic gate 20 is also configured to be operative with the same rack and pinion system and, in the embodiment described herein with the piece of rack 38, particularly with the pinion shaft. However, a pneumatic gate that is interchangeable with a gravity fed sliding gate according to the present invention is not limited to use with a hopper bottom trailer having a rack and pinion moving and retaining system. Rather, in alternate configurations that are either commercially available or to be developed in which the existing sliding gate on the hopper bottom trailer is retained and controlled using a different mechanism, the pneumatic gate may be adapted to include a complementary frame structure so as to be retained using the mechanism of the existing sliding gate. As an example, the pneumatic gate does not require full rack and pinion movement control to slide the gate into place and, once mounted, does not have to be opened in the manner of a gravity fed sliding gate. Further, the pneumatic gate does not even require a pinion shaft as the gate may be held by any number of other mechanisms to lock the gate in place once mounted in the hopper frame. Further, the pneumatic gate may be mounted to the hopper frame using retaining elements other than those used with the gravity sliding gate. For example, the pneumatic gate may be removably secured to the hopper frame, such as with bolts, fasteners and the like, for use during pneumatic discharge and then removed to allow the gravity sliding gate to be reinstalled using whatever moving and retaining mechanism was already resident on the hopper bottom trailer. An example of a bolt-mounted interchangeable gate configuration is provided herein as the second embodiment of the present invention which will be described subsequently in connection with FIGS. 31-37. Therefore, the pneumatic gate according to the present invention may be configured to be operational with, and/or able to accommodate, any number of moving and retaining systems used in connection with hopper bottom trailer gates while providing the same interchangeability with a gravity fed sliding gate as has just been described herein in connection with the first embodiment.

FIGS. 31-37 show the second embodiment of the system and method for alternately and interchangeably mounting a gravity discharge gate and a pneumatic discharge gate on a hopper bottom trailer according to the present invention. Instead of using a hopper frame that includes frame rails and rollers for slidably mounting and dismounting the two types of discharge gates on the hopper, according to the second embodiment each gate has its own trap frame for securing the gate to a fixed mounting surface on the hopper.

Figure 34:
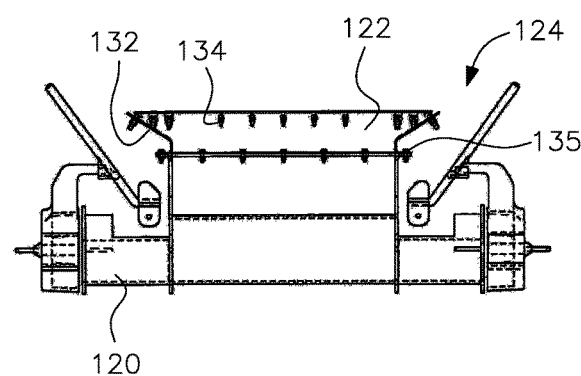
FIG. 34 is an end view of the pneumatic gate and trap frame shown in FIG. 31.
Figure 35:
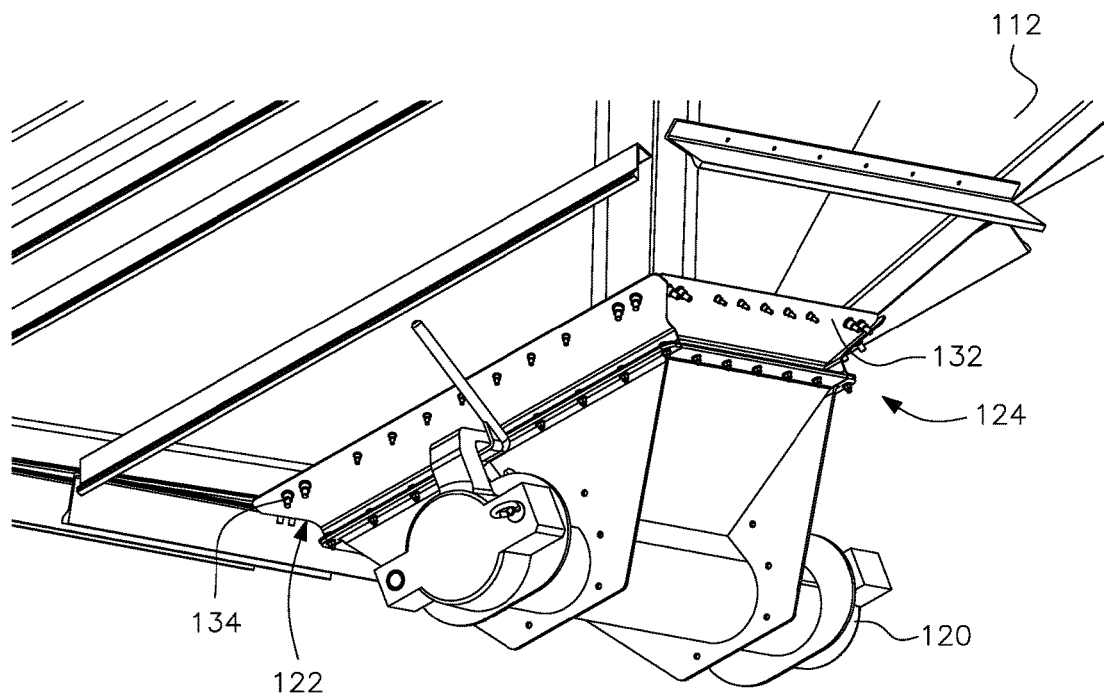
FIG. 35 is a side perspective view of a pneumatic gate and trap frame as mounted to a hopper in accordance with the second embodiment.
Figure 36:
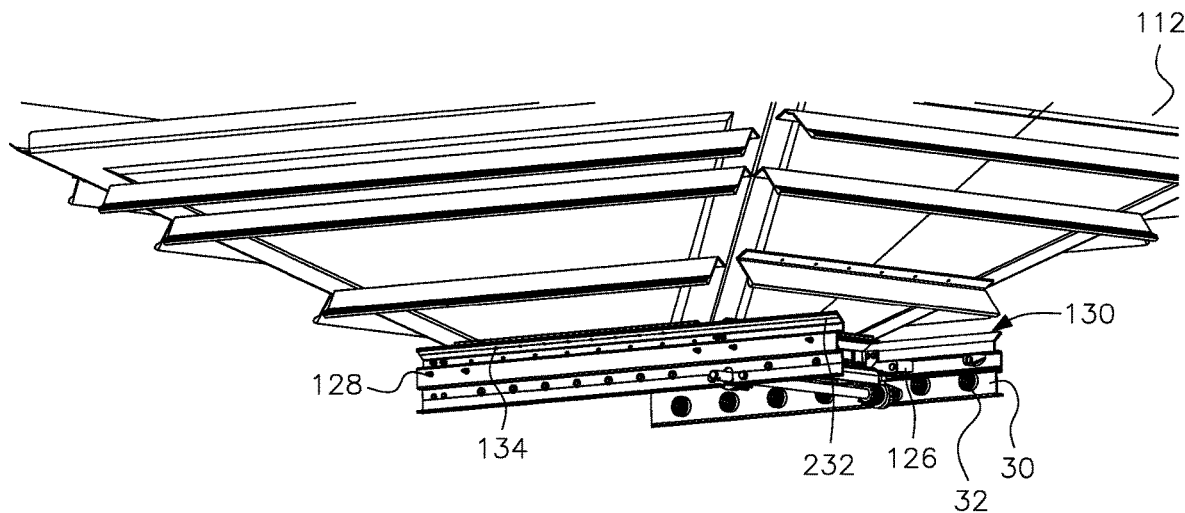
FIG. 36 is a side perspective view of a gravity gate and trap frame as interchanged with the pneumatic gate and mounted to the hopper shown in FIG. 35.

More particularly, and as shown in FIGS. 34 and 35, a pneumatic discharge gate 120 is provided that is equipped with a trap frame, generally designated by reference numeral 122, to form a pneumatic discharge gate assembly generally designated by reference numeral 124 which is mounted to hopper 112. Similarly, a gravity discharge gate 126 is provided having its own trap frame 128 to form a gravity discharge gate assembly generally designated by reference numeral 130 which is mounted to the hopper 112 as shown in FIG. 36. Each trap frame is configured to removably couple its associated gate to the hopper 112 in like manner as the other gate assembly.

Figure 32:
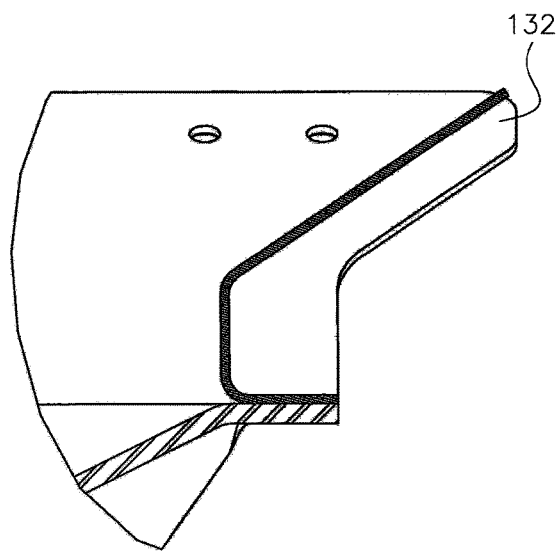
FIG. 32 is an enlarged view of Detail A of FIG. 31.
Figure 33:
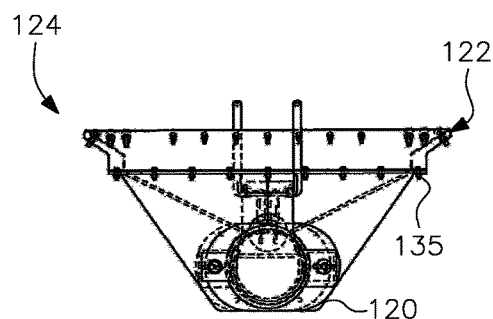
FIG. 33 is a side view of the pneumatic gate and trap frame shown in FIG. 31.

The trap frame 122 of the pneumatic discharge gate assembly 124 includes an angled flange 132 having a plurality of apertures that respectively receive a plurality of fastening elements 134. As best seen in FIG. 32, the flange 132 is sloped to correspond with the slope of the bottom wall mounting surface 113 (see FIG. 37) of the hopper 112. According to the embodiment shown, the lower edge of the trap frame 122 also has apertures that receive fastening elements 135 to secure the frame to the gate 120. Alternately, the frame 122 may be welded or otherwise connected to the gate to form the assembly 124.

Like the pneumatic discharge gate assembly, the trap frame 128 of the gravity gate 126 also has an upper flange 232 having a plurality of apertures that respectively receive the plurality of fastening elements 134. The flange 232 is angled or sloped like flange 132 to correspond with the slope of the bottom wall mounting surface 113 of the hopper 112. The rails 30 and rollers 32 used to support and move the gravity gate 126 are secured to the lower side of the trap frame 128.

The fastening elements 134 are preferably bolts or the like that can be removably secured with nuts. The fastening elements 134 rigidly secure the gate assembly 124 to the mounting surface 113 of the hopper 112 when the hopper bottom trailer is configured for pneumatic discharge operation.

Conversely, when the hopper bottom trailer is to be used for gravity discharge operation, the pneumatic discharge gate assembly 124 is removed by unbolting the fastening elements 134. The gravity discharge gate assembly 130 is then mounted to the hopper 112 using the same fastening elements 134 or fastening elements of the same type. The gravity fed sliding gate and the pneumatic outlet gate may thus be interchangeably and rigidly secured to the fixed mounting surface 113 of the hopper 112 for unloading different types of particulate materials from the trailer using either gravity fed or pneumatic pressure to discharge the materials through the hopper discharge opening.

Figure 37:
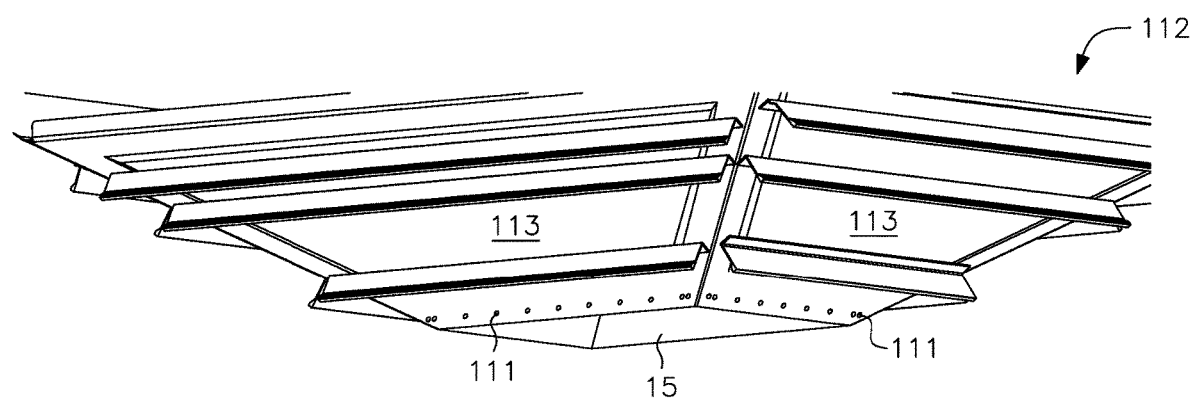
FIG. 37 is a side perspective view of the hopper shown in FIGS. 35 and 36 without a gate assembly mounted thereon.

As can be seen when comparing FIGS. 35 and 36 with FIG. 37, the arrangement of apertures with fastening elements 134 on the gates matches a corresponding pattern of apertures 111 on the hopper mounting surface 113 and is the same for both gates for ready interchangeability. The gate assemblies 124 and 130 provide improved sealing characteristics to contain the particulate matter and also facilitate cleaning out of the matter when changing between gate assemblies.

As shown by the drawings and described herein, the system and method of the present invention enables a hopper bottom trailer equipped with a conventional gravity fed sliding gate to be readily enabled for operational use with a pneumatic outlet gate and then returned to a gravity fed sliding gate configuration. Whether constructed in accordance with the first embodiment or the second embodiment, both types of gates within each respective embodiment use a shared hopper structure for retention on the bottom of the hopper, making the pneumatic outlet gate and the gravity fed sliding gate fully interchangeable. As a result, the same trailer can be used for either gravity fed or pneumatic gate operation according to the specific hauling needs at any given time for enhanced usage capability.

The foregoing descriptions and drawings should be considered as illustrative only of the principles of the invention. The invention may be configured in a variety of shapes and sizes and is not limited by the dimensions of the preferred embodiment. Therefore, it is not desired to limit the invention to the specific examples disclosed or the exact construction and operation shown and described. Rather, all suitable modifications and equivalents may be resorted to, falling within the scope of the invention.

What is claimed is:

1. A system for converting a hopper bottom trailer between gravity fed operation and pneumatic discharge operation comprising:
   a hopper bottom trailer having a bottom structure;
   a conventional gravity fed sliding gate; and
   a pneumatic outlet gate;
   said gravity fed sliding gate and said pneumatic outlet gate being alternately and interchangeably retained on said same bottom structure of the hopper such that only one of said gate is carried by the trailer at any given time, the pneumatic gate being removed from the trailer when the gravity fed sliding gate is retained on the bottom structure and the gravity fed sliding gate being removed from the trailer when the pneumatic gate is retained on the bottom structure.

2. The system as set forth in claim 1, wherein the pneumatic outlet gate includes a generally horizontal support frame defining a central open area and a pneumatic discharge assembly attached to an underside of said support frame, said support frame being configured to be installed on or within the hopper bottom structure which includes a hopper frame normally occupied by the gravity fed sliding gate on the hopper bottom trailer, said support frame central open area being in product flow communication with a downwardly facing discharge opening of a bottom hopper of said hopper bottom trailer, and said pneumatic discharge assembly containing controls for product metering and air flow during pneumatic unloading.

3. The system as set forth in claim 2, wherein the hopper frame structure includes at least two generally parallel frame rails and a plurality of rollers.

4. The system as set forth in claim 1, wherein the pneumatic outlet gate is configured with a trap frame to form a pneumatic outlet gate assembly, said trap frame defining a central open area and the pneumatic gate being attached to an underside of said trap frame, said trap frame being configured to be installed on the hopper bottom structure which includes a mounting surface on the hopper to which either a gravity sliding gate assembly or the pneumatic outlet gate assembly may be coupled, said central open area being in product flow communication with a downwardly facing discharge opening of the hopper of said hopper bottom trailer, and said pneumatic discharge assembly containing controls for product metering and air flow during pneumatic unloading.

5. The system as set forth in claim 4, wherein the trap frame is secured to the mounting surface using a plurality of fastening elements.

6. The system as set forth in claim 5, wherein the fastening elements are bolts.

7. A hopper bottom trailer for transporting and discharging particulate materials comprising:
   a trailer having at least one bottom hopper with a downwardly facing discharge opening and a hopper frame structure for mounting a gate; and
   a gravity fed sliding gate and a pneumatic outlet gate alternately and interchangeably mountable on said bottom hopper for unloading different types of particulate materials from said trailer by either gravity fed unloading or pneumatic unloading through said discharge opening, the pneumatic outlet gate being mounted on the bottom hopper using the same hopper frame structure already existing on the hopper bottom trailer to support the gravity fed sliding gate, only one of said gates being carried by the trailer at any given time, the pneumatic gate being removed from the trailer when the gravity fed sliding gate is retained on the hopper frame structure, and the gravity fed sliding gate being removed from the trailer when the pneumatic gate is retained on the hopper frame structure.

8. The hopper bottom trailer as set forth in claim 7, wherein said pneumatic outlet gate includes a generally horizontal support frame and a pneumatic discharge assembly attached to said support frame that contains controls for product metering and air flow during pneumatic unloading, said pneumatic gate support frame defining a central open area and being configured to be mounted on said hopper frame structure alternately used for mounting of the gravity fed sliding gate, said support frame central open area being in product flow communication with the downwardly facing discharge opening of said bottom hopper when said pneumatic outlet gate is installed on said hopper frame structure.

9. The hopper bottom trailer as set forth in claim 7, wherein the pneumatic outlet gate is configured with a trap frame to form a pneumatic outlet gate assembly, said trap frame defining a central open area and the pneumatic gate being attached to an underside of said trap frame, said trap frame being configured to be installed on a mounting surface on the hopper frame structure to which either a gravity sliding gate assembly that include a gravity sliding gate a gravity gate trap frame, or the pneumatic outlet gate assembly may be alternately coupled, said central open area being in product flow communication with the downwardly facing discharge opening of the hopper of said hopper bottom trailer, and said pneumatic discharge assembly containing controls for product metering and air flow during pneumatic unloading.

10. A pneumatic outlet gate for use in discharging particulate matter from a hopper bottom trailer which comprises a generally horizontal support frame defining a central open area, said support frame being configured to be mounted on a hopper structure normally occupied by a gravity fed sliding gate for a bottom hopper of said hopper bottom trailer, said support frame central open area being in product flow communication with a downwardly facing discharge opening of said bottom hopper, and a pneumatic discharge assembly attached to said support frame, said pneumatic discharge assembly and support frame being alternately and interchangeably retained on said her structure relative to said gravity fed sliding gate so that only said pneumatic discharge assembly or said gravity fed sliding gate is carried by the hopper bottom trailer at any given time.

11. The pneumatic outlet gate as set forth in claim 10, wherein the pneumatic discharge assembly is attached to an underside of said support frame and includes controls for product metering and air flow during pneumatic unloading.

12. A method for use with a hopper bottom trailer having at least one hopper comprising interchanging a conventional gravity fed sliding gate on the hopper bottom trailer with a pneumatic outlet gate and vice versa, the gates being interchangeable using the same hopper structure to retain either of said gates on a bottom of the hopper, only one of said gates being carried by the trailer at any given time, the pneumatic outlet gate being removed from the trailer when the gravity fed sliding gate is retained on the bottom of the hopper, and the gravity fed sliding gate being removed from the trailer when the pneumatic gate is retained on the bottom of the hopper.

13. The method as set forth in claim 12, wherein the hopper structure is a mounting surface and each of said gates is configured with a respective trap frame to form a pneumatic outlet gate assembly and a separate gravity outlet gate assembly, said method including:
  bolting said pneumatic gate assembly to the mounting surface for pneumatic unloading;
  upon completion of pneumatic unloading, unbolting and removing said pneumatic gate assembly from the trailer; and
  bolting said gravity outlet gate assembly to the mounting surface for gravity fed unloading.

14. The method as set forth in claim 12, wherein the hopper structure is a hopper frame including hopper frame rails and rollers, each of said gates being configured to slide onto the frame rails using the rollers, said method including:
  securing said pneumatic gate to the hopper frame for pneumatic unloading;
  upon completion of pneumatic unloading, sliding out the pneumatic gate and removing said pneumatic gate from the trailer; and
  sliding in and securing said gravity outlet gate to the hopper frame for gravity fed unloading.

* * * * *